United States Patent [19]

Wuerfel

[11] 4,427,960
[45] Jan. 24, 1984

[54] MAGNETIC HOLDER FOR SMALL ARTICLES

[76] Inventor: Robert P. Wuerfel, 4620 NW. 45th Ct., Fort Lauderdale, Fla. 33319

[21] Appl. No.: 447,413

[22] Filed: Dec. 6, 1982

[51] Int. Cl.³ .............................................. H01F 7/20
[52] U.S. Cl. ...................................... 335/285; 335/306
[58] Field of Search ............... 335/285, 295, 303, 306; 308/10

[56] References Cited

U.S. PATENT DOCUMENTS

| | | | |
|---|---|---|---|
| 2,693,788 | 11/1954 | Spatz | 335/285 X |
| 3,196,566 | 7/1965 | Littlefield | 335/306 X |
| 3,233,950 | 2/1966 | Baermann | 308/10 |
| 3,326,610 | 6/1967 | Baermann | 335/306 X |
| 3,493,274 | 2/1970 | Emslie et al. | 308/10 |
| 3,609,606 | 9/1971 | Podesto | 335/306 X |

*Primary Examiner*—George Harris
*Attorney, Agent, or Firm*—Oltman and Flynn

[57] ABSTRACT

A magnetic holder for paper clips or other small magnetically attractable articles comprises a base magnet with a permanently polarized top face of one magnetic polarity, a non-magnetic guide post extending up from the center of the base magnet, and a floating magnet with a central opening which loosely receives the post and a permanently polarized bottom face of the same magnetic polarity as the top face of the base magnet.

9 Claims, 4 Drawing Figures

U.S. Patent    Jan. 24, 1984    4,427,960
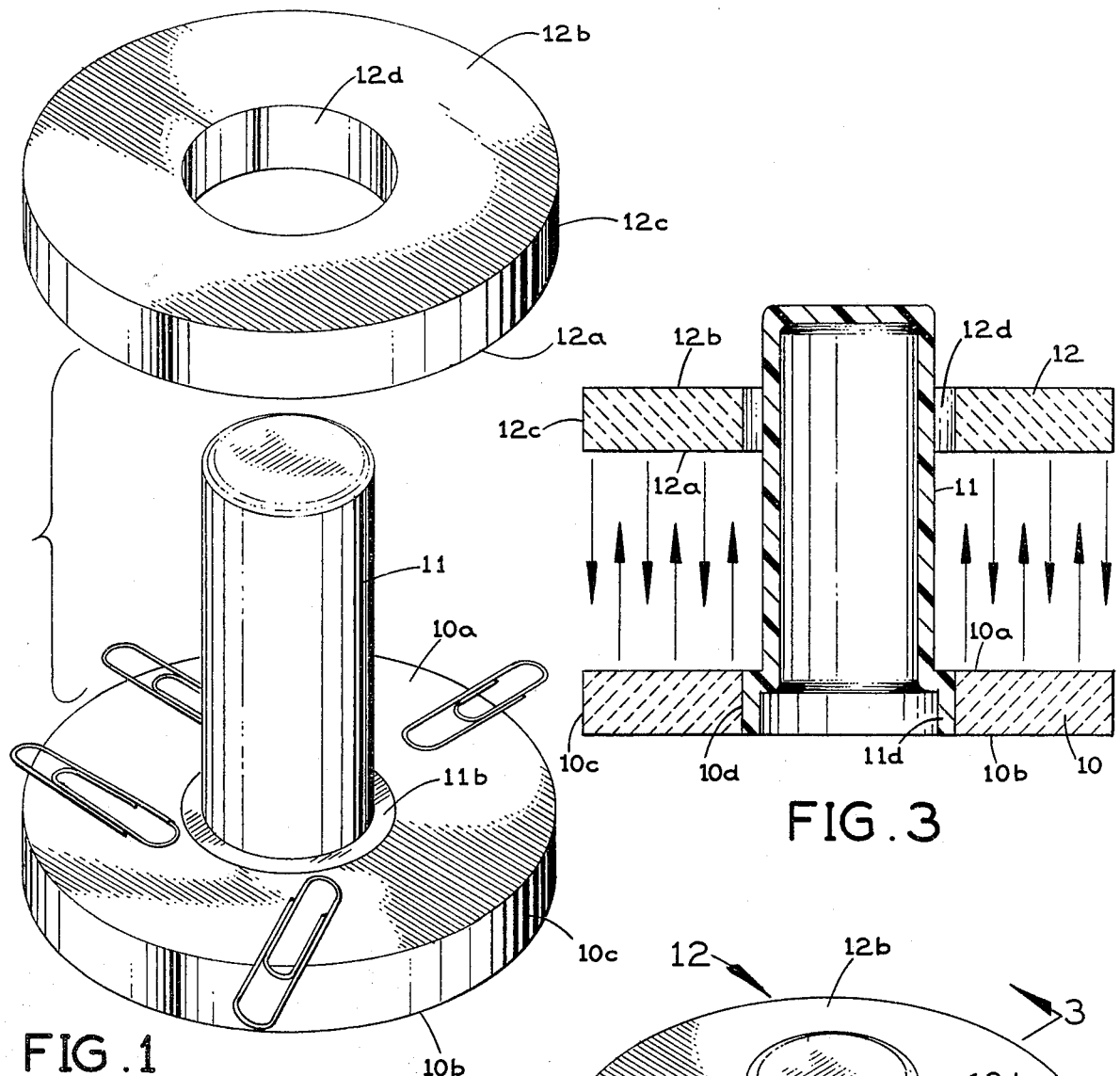
FIG.1
FIG.3
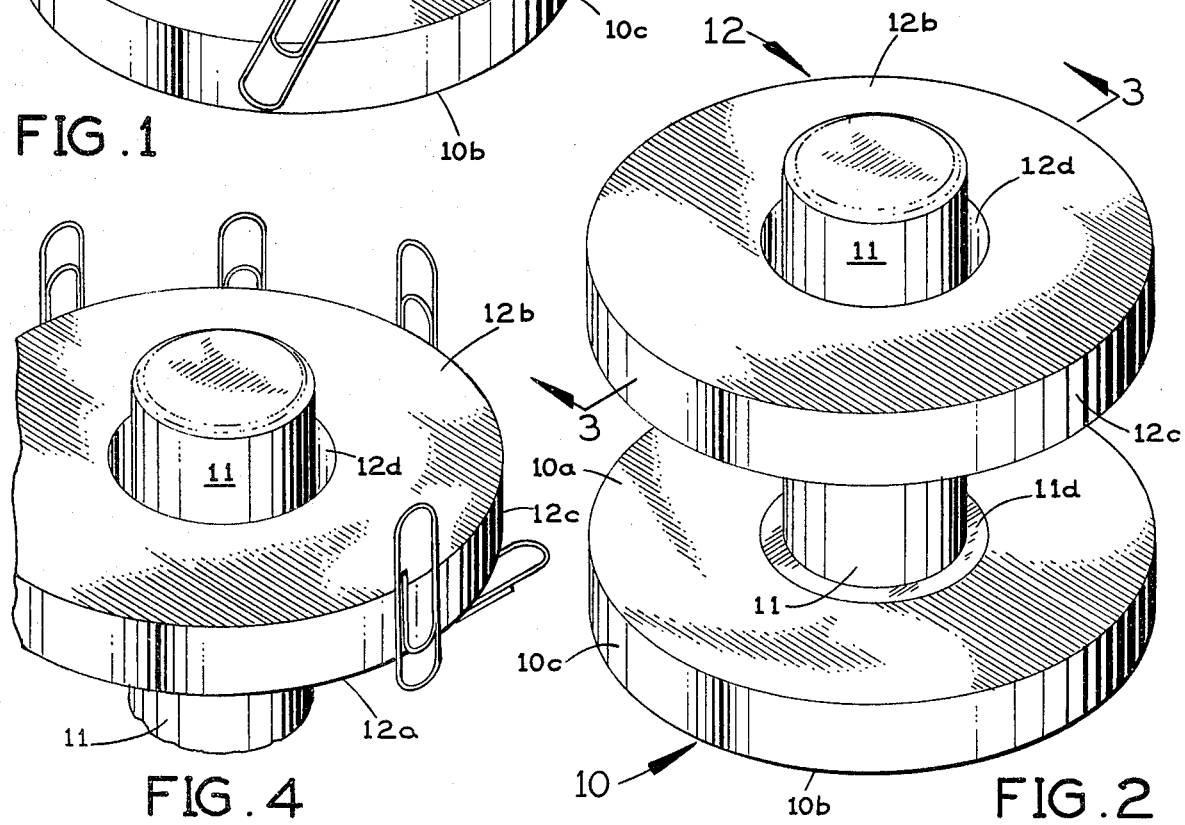
FIG.4
FIG.2

MAGNETIC HOLDER FOR SMALL ARTICLES

SUMMARY OF THE INVENTION

This invention relates to a magnetic holder for small articles, particularly paper clips.

A principal object of this invention is to provide a novel magnetic holder for small magnetically attractable articles, such as paper clips, which makes those articles readily accessible for easy removal from the holder.

Another object of this invention is to provide such a magnetic holder which keeps the articles visible at all times.

Another object of this invention is to provide such a holder having a floating magnet which can move up and down and can be rotated to facilitate access to a selected paper clip or other small article held magnetically on the floating magnet.

In accordance with a presently-preferred embodiment of the invention, a flat circular base magnet presents an exposed top face of one magnetic polarity and supports an upwardly extending, centrally positioned, non-magnetic guide post which is loosely encircled by a flat circular floating magnet having its bottom face of the same magnetic polarity as the top face of the base magnet. The magnetic repulsion between the two magnets offsets the force of gravity on the floating magnet and keeps it suspended above the base magnet. The floating magnet can move up and down along the post and it can be rotated about the post without changing its magnetic coupling with the base magnet which keeps it (the floating magnet) floating above the base magnet. Paper clips or other small magnetically attractable articles can be placed on the peripheral edge or the top or bottom face of the floating magnet, or on the peripheral edge or the top face of the base magnet, and held there by magnetic attraction until deliberately removed manually.

Further objects and advantages of this invention will be apparent from the following description of a presently-preferred embodiment which is illustrated schematically in the accompanying drawing.

DESCRIPTION OF THE DRAWING

FIG. 1 is an exploded perspective view of the present magnetic holder;

FIG. 2 is a perspective view of the holder in its operative assembled position;

FIG. 3 is a vertical cross-section taken along the line 3—3 in FIG. 2; and

FIG. 4 is a fragmentary perspective view of the upper end of the holder.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION

Referring first to FIG. 2, the magnetic holder of the present invention comprises a base magnet 10, a non-magnetic guide post 11 extending up from the base magnet, and a floating magnet 12 loosely encircling the post 11 near its upper end and kept freely suspended above the base magnet 10 by the magnetic repulsion between them, which offsets the force of gravity pulling down on the floating magnet.

The base magnet 10 is a ring having a permanently polarized flat top face 10a of one magnetic polarity, a permanently polarized flat bottom face 10b of the opposite magnetic polarity, and a cylindrical peripheral edge 10c extending between its top and bottom faces. The base magnet is of any suitable permanently magnetizable material, such as a fine particle, ceramic or rare earth magnet. The base magnet 10 is formed with a circular central opening 10d which receives an enlarged flange lid on the lower end of post 11 to anchor the lower end of the post.

The guide post 11 is of cylindrical cross-section and is of any suitable non-magnetizable material. It projects up vertically from the base magnet 10 to provide a guide for limiting the lateral displacement of the floating magnet 12 in any direction. The guide post may be of any cross-section which will provide vertical guidance to the floating magnet. If a hollow cylinder, it may be used as a pencil holder.

The floating magnet 12 preferably is the same permanently magnetizable material as the base magnet 10. It presents a permanently polarized, flat, bottom face 12a of the same magnetic polarity as the top face 10a of the base magnet 10, a magnetically polarized, flat, top face 12b of the opposite magnetic polarity, and a cylindrical peripheral edge 12c extending between its top and bottom faces. The floating magnet 12 has a circular central opening 12d which loosely receives the upstanding guide post 11 as best seen in FIG. 3.

As indicated schematically in FIG. 3 by the arrows, because their confronting faces 10a and 12a have the same magnetic polarity, the two magnets 10 and 12 repel each other axially of the guide post 11. That is, the magnetic repulsion between them exerts an upward force on floating magnet 12 which offsets the downward force of gravity on this magnet so that it floats in air in a position in which it is part-way down along the guide post 11. The post 11 interfits with the floating magnet 12 in such a way as to limit the extent to which the floating magnet can be displaced laterally with respect to the base magnet 10, so that the desired magnetic coupling (in this case, repulsion) is maintained between the two magnets in all positions of the floating magnet on the post 11.

As shown in FIG. 4, paper clips or other small magnetically attractable articles are held magnetically against the peripheral edge 12c of the floating magnet 12 with enough force to keep them in place, but permitting them to be removed manually. Also, such articles will be held in place against the top face 12b or the bottom face 12a of the floating magnet after being placed against either of those faces. Likewise, such articles will be held in place by magnetic attraction against the peripheral edge 10c or the exposed top face 10a of the base magnet 10. It will be apparent, then, that a large number of small articles, such as paper clips, can be held by the present magnetic holder in position for ready manual removal from the holder. The floating magnet 12 can be rotated about the axis of post 11 for easier access to any particular article it is holding.

In addition to its strictly utilitarian function, some users may find it relaxing to play with the holder, such as by pushing down on the floating magnet 12 and then releasing it and watching it bounce up and down, or by spinning the floating magnet about the post 11. The busy executive can do this while sitting at his desk whereas normally he would have to stand up to play with his yo-yo or practice his golf putting stroke or perform whatever diversion he may have adopted for relaxing in the office or impressing his co-workers.

If desired, the single guide post 11 may be replaced by two or more rigid guide members extending up from the base magnet 10 and slidably passing the floating magnet 12 other than at the center of the latter. For example, several guide members might extend up from the base magnet at spaced locations circumferentially around the floating magnet 12 to confine the latter between them while permitting up and down movement and rotation of the floating magnet. In this case, the magnets would not need a central opening.

Two or more magnets may be floated on the guide post by placing each additional magnet with like poles facing each other.

I claim:

1. A magnetic holder for small magnetically attractable articles comprising:
    a base magnet having a magnetically polarized top face of one magnetic polarity;
    rigid guide means extending up from said base magnet;
    a floating magnet interfitting with said guide means above said base magnet to limit lateral displacement of said floating magnet, said floating magnet having a magnetically polarized bottom face of said one magnetic polarity which is repelled by the top face of the base magnet to offset the downward force of gravity on said floating magnet and maintain said floating magnet spaced above said base magnet; and
    said base magnet and floating magnet constructed for attachment of small magnetically attractable articles thereto in the space between said base magnet and said floating magnet.

2. A magnetic holder according to claim 1, wherein said floating magnet has magnetically polarized top and bottom faces of opposite polarities and an exposed peripheral edge between its top and bottom faces against which small magnetically attractable articles are held magnetically.

3. A magnetic holder according to claim 2, wherein:
    said rigid guide means is a non-magnetic post extending up from said base magnet;
    and said floating magnet has an opening therein which loosely receives said post.

4. A magnetic holder according to claim 3, wherein said floating magnet is a ring having flat top and bottom faces and a cylindrical peripheral edge and having said opening at the center.

5. A magnetic holder according to claim 4, wherein said base magnet has a flat top face and a cylindrical peripheral edge against which small magnetically attachtable articles are held magnetically.

6. A magnetic holder according to claim 1, wherein:
    said base magnet has an exposed top face and an exposed peripheral edge against which small magnetically attractable articles are held magnetically;
    and said floating magnet has exposed top and bottom faces of opposite magnetic polarities and an exposed peripheral edge between its top and bottom faces against which small magnetically attractable articles are held magnetically.

7. A magnetic holder according to claim 6, wherein:
    said rigid guide means is a non-magnetic post extending up from said base magnet;
    and said floating magnet has an opening which loosely receives said post.

8. A magnetic holder according to claim 7, wherein:
    said post extends up from the center of said base magnet;
    and said opening is at the center of the floating magnet.

9. A magnetic holder according to claim 1, wherein:
    said rigid guide means is a non-magnetic post extending up from said base magnet;
    and said floating magnet has an opening which loosely receives said post.

* * * * *